US007243903B2

(12) United States Patent
Wincek

(10) Patent No.: US 7,243,903 B2
(45) Date of Patent: *Jul. 17, 2007

(54) VALVE DIAPHRAGM WITH A COMPRESSION RESTRAINING RING, AND VALVE INCLUDING SAME

(76) Inventor: Christopher P. Wincek, 15 Los Pioneros, Rancho Santa Margarita, CA (US) 92688

( * ) Notice: Subject to any disclaimer, the term of this patent is extended or adjusted under 35 U.S.C. 154(b) by 31 days.

This patent is subject to a terminal disclaimer.

(21) Appl. No.: 11/182,669

(22) Filed: Jul. 15, 2005

(65) Prior Publication Data

US 2006/0289825 A1 Dec. 28, 2006

Related U.S. Application Data

(63) Continuation-in-part of application No. 11/159,009, filed on Jun. 22, 2005.

(51) Int. Cl.
*F16K 7/16* (2006.01)
(52) U.S. Cl. .................. 251/331; 251/368
(58) Field of Classification Search ............ 251/331, 251/335.2, 368
See application file for complete search history.

(56) References Cited

U.S. PATENT DOCUMENTS

| 2,324,880 | A | | 7/1943 | Rogers et al. | |
|---|---|---|---|---|---|
| 2,575,775 | A | | 11/1951 | Teeters | |
| 2,578,730 | A | | 12/1951 | Nicholson et al. | |
| 2,654,559 | A | * | 10/1953 | Franck | 251/331 |
| 2,891,763 | A | | 7/1959 | Fortune | |
| 3,067,764 | A | * | 12/1962 | Geary | 251/331 |
| 3,130,954 | A | * | 4/1964 | McFarland, Jr. | 251/331 |
| 4,070,004 | A | * | 1/1978 | Friswell | 251/331 |
| 4,176,675 | A | * | 12/1979 | Liberman | 251/306 |
| 4,421,295 | A | | 12/1983 | Parkison | |
| 4,720,079 | A | * | 1/1988 | Iizuka et al. | 251/331 |
| 4,787,736 | A | * | 11/1988 | Mori et al. | 251/368 |
| 4,819,691 | A | * | 4/1989 | Lofgren et al. | 251/331 |
| 4,917,357 | A | * | 4/1990 | Danko | 251/331 |
| 5,020,776 | A | * | 6/1991 | Owens et al. | 251/327 |
| 5,186,434 | A | * | 2/1993 | Nishimura et al. | 251/331 |
| 5,295,662 | A | * | 3/1994 | Yamaji et al. | 251/331 |
| 5,335,691 | A | * | 8/1994 | Kolenc | 251/331 |
| 5,386,849 | A | | 2/1995 | Gilchrist et al. | |
| 5,413,311 | A | * | 5/1995 | Arstein et al. | 251/331 |
| 5,417,235 | A | * | 5/1995 | Wise et al. | 251/368 |
| 5,524,865 | A | * | 6/1996 | Uchisawa et al. | 251/331 |
| 5,560,587 | A | * | 10/1996 | McCutcheon et al. | 251/327 |
| 5,697,398 | A | * | 12/1997 | Gidney et al. | 137/484.8 |
| 5,762,544 | A | | 6/1998 | Zuniga et al. | |
| 5,820,105 | A | * | 10/1998 | Yamaji et al. | 251/331 |
| 5,829,472 | A | | 11/1998 | Greenwood et al. | |
| 5,851,004 | A | * | 12/1998 | Wu et al. | 251/331 |
| 5,967,492 | A | * | 10/1999 | Navratil et al. | 251/331 |
| 6,016,838 | A | * | 1/2000 | Wigmore | 251/367 |

(Continued)

FOREIGN PATENT DOCUMENTS

JP 06159529 11/1992

*Primary Examiner*—John Bastianelli
(74) *Attorney, Agent, or Firm*—Eric Karich

(57) ABSTRACT

A valve has a body, a bonnet, an actuator mechanism, and a flexible diaphragm adapted to be positioned between the bonnet and the body. The flexible diaphragm has a central portion and a peripheral portion, and the central portion is covered with a thin alloy layer.

14 Claims, 2 Drawing Sheets

U.S. PATENT DOCUMENTS

| | | |
|---|---|---|
| 6,047,953 A | 4/2000 | Jacob, Jr. |
| 6,079,692 A * | 6/2000 | Powell ................... 251/61.1 |
| 6,145,810 A * | 11/2000 | Connolly et al. ........... 251/331 |
| 6,155,535 A | 12/2000 | Marcilese |
| 6,295,918 B1 | 10/2001 | Simmons et al. |
| 6,416,038 B1 * | 7/2002 | Sindel et al. ............... 251/331 |
| 6,505,814 B1 * | 1/2003 | Satou et al. ................ 251/331 |
| 6,616,125 B2 * | 9/2003 | Brown et al. ............... 251/368 |
| 6,685,164 B1 * | 2/2004 | Koizumi et al. ............ 251/331 |
| 6,685,444 B2 * | 2/2004 | Ogawa .................... 417/413.1 |
| 2004/0262562 A1 | 12/2004 | Maula et al. |

* cited by examiner

VALVE DIAPHRAGM WITH A COMPRESSION RESTRAINING RING, AND VALVE INCLUDING SAME

CROSS-REFERENCE TO RELATED APPLICATIONS

This application for a utility patent is a continuation-in-part of a previously filed utility patent, still pending, having the application Ser. No. 11/159,009, filed Jun. 22, 2005.

STATEMENT REGARDING FEDERALLY SPONSORED RESEARCH

Not Applicable

BACKGROUND OF THE INVENTION

1. Field of the Invention

This invention relates generally to valves used to control flows of fluids, and more particularly to valves such as weir type diaphragm valves having moveable diaphragms to control flows.

2. Description of Related Art

Diaphragm valves have moveable diaphragms to control fluid flows, and are commonly used for processing high purity fluids used in the pharmaceutical, biotechnical, chemical, food, and semiconductor industries. Their prevalent use is mainly due to their exceptional ability to resist damage from fluids (e.g., reactive chemicals). The diaphragms are typically the only moving parts that come in contact with the fluids, and the diaphragms typically isolate other moving parts from the fluids.

A major disadvantage with diaphragm valves is that the diaphragms wear out and require periodic replacement. The diaphragm is typically a flexible material sandwiched between a bonnet and a body drawn together by tightening several fasteners. A problem arises in that the flexible diaphragm offers little resistance to forces exerted on the diaphragm as the fasteners are tightened. During assembly of a diaphragm valve, there is a tendency to over-tighten the fasteners in an effort to assure leak-proof junctions. Over-tightening of the fasteners causes over-compression of the diaphragm, which often results in rupture and early failure of the diaphragm.

Various solutions to this problem have been attempted in the prior art. Jacob, Jr., U.S. Pat. No. 6,047,953, for example, teaches a universal diaphragm made of elastomeric material having rigid solid compression restrainers incorporated within the perimeter of the diaphragm for preventing over-compression of the diaphragm during the assembly of a diaphragm valve. The compression restrainers can be designed to occupy several positions within the area of the diaphragm that is pressed between the bonnet and valve body of the diaphragm valve. The compression restrainers are bonded or vulcanized onto the surface of the elastomeric material making up the diaphragm.

Marcilese, U.S. Pat. No. 6,155,535, illustrates the use of similar stops incorporated into the bonnet and/or valve body.

Other patents of interest include Simmons, et al., U.S. Pat. No. 6,295,918, G. E. Nicholson, et al., U.S. Pat. No. 2,578,730, Parkinson, U.S. Pat. No. 4,421,295, R. Fortune, U.S. Pat. No. 2,891,763, Greenwood, U.S. Pat. No. 5,829,472, Gilchrist, et al., U.S. Pat. No. 5,386,849, W. O. Teeters, U.S. Pat. No. 2,575,775, Maula, et al., U.S. 2004/0262562, Zuniga, et al., U.S. Pat. No. 5,762,544, and Makoto, Japan 04310701 (diaphragm seal mechanism having a metal O-ring spacer).

It would be beneficial to have a valve with a moveable diaphragm clamped between a bonnet and a body and one or more structures that provide circumferential sealing between the bonnet and the body, and also prevent over-compression of the flexible diaphragm.

SUMMARY OF THE INVENTION

The present invention teaches certain benefits in construction and use which give rise to the objectives described below.

The present invention provides a valve having a body, a bonnet, an actuator mechanism, and a flexible diaphragm adapted to be positioned between the bonnet and the body. The flexible diaphragm has a central portion and a peripheral portion, and the central portion is covered with a thin alloy layer.

A primary objective of the present invention is to provide a flexible diaphragm of a valve having advantages not taught by the prior art.

Another objective is to provide a valve that includes a flexible diaphragm having a thin alloy layer for preventing leachables from the flexible diaphragm from contaminating fluid flowing through the valve.

A further objective is to provide a valve that forms a superior seal to prevent leakage and/or contamination.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
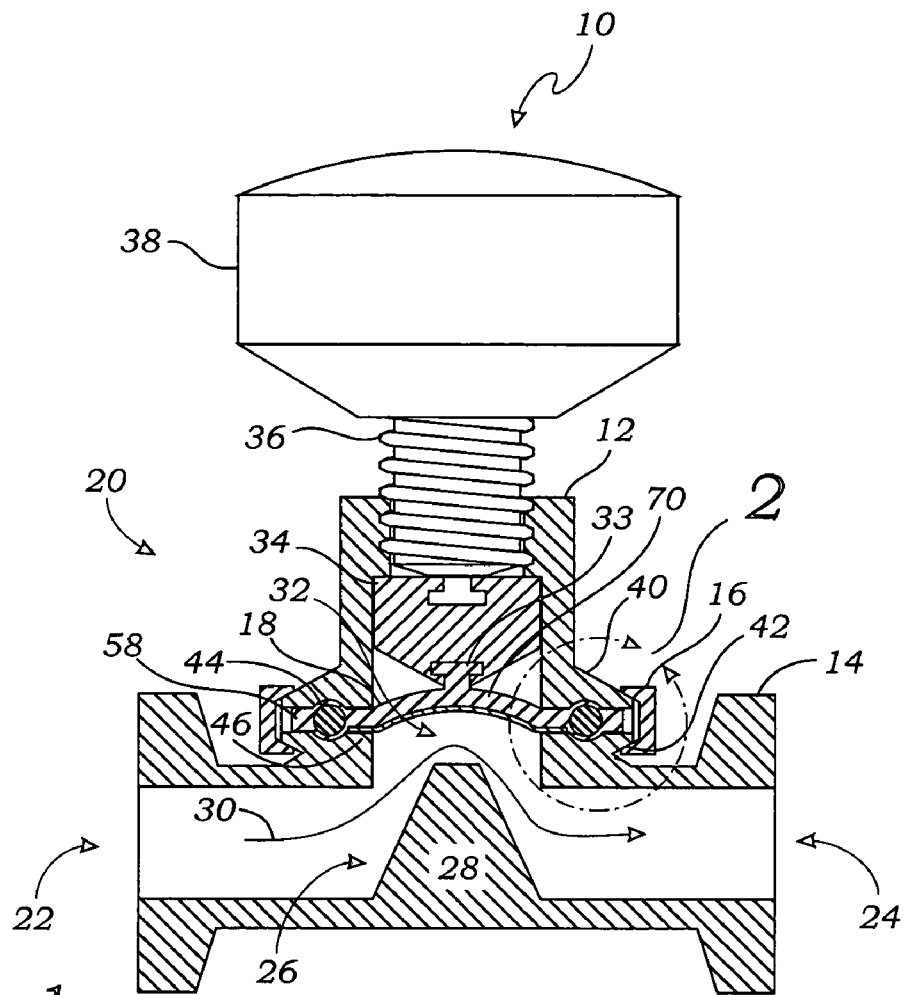
FIG. 1 is a perspective view of one embodiment of a valve including a bonnet clamped to a body via a band clamp, wherein a flexible diaphragm is positioned between the bonnet and the body.

FIG. 1 is a perspective view of one embodiment of a valve 10 including a bonnet 12 clamped to a body 14 via a band clamp 16. A flexible diaphragm 18 is positioned between the bonnet 12 and the body 14. The flexible diaphragm 18 is moved between an open configuration, shown in FIG. 1, and a closed configuration, via an actuator mechanism 20 housed in the bonnet 12. The valve 10 of FIG. 1 is commonly referred to as a diaphragm valve.

In general, the body 14 has an input port 22, an output port 24, and a central portion 26 positioned between the input port 22 and the output port 24. In the open configuration of the diaphragm 18 of FIG. 1, the input port 22 and output port 24 are in fluid communication with each other. That is, fluid is free to flow between the input port 22 and output port 24 in the open configuration.

In the embodiment of FIG. 1, the valve 10 has a weir 28 in one side of a passageway 30 extending between input port 22 and the output port 24. The body 14 has a work opening 32 in a side of the passageway 30 opposite the weir 28. The diaphragm 18 is sealed between the bonnet 12 and the body 14 and covers the work opening 32, thereby making the passageway 30 fluid tight. In the open configuration of the diaphragm 18 of FIG. 1, there is a space between a bottom surface of the diaphragm 18 and a top surface of the weir 28, and the passageway 30 is open.

Generally speaking, in the closed configuration of the diaphragm 18 the diaphragm 18 blocks the central portion 26, thereby preventing fluid flow between the input port 22 and the output port 24. In the embodiment of FIG. 1, in the closed configuration of the diaphragm 18, the bottom surface of the diaphragm 18 contacts the top surface of the weir 28, closing off the passageway 30.

As described in more detail below, the diaphragm 18 has a central portion 70 and a peripheral portion 58 surrounding the central portion 70. The peripheral portion 58 is adapted to be clamped between the bonnet 12 and the body 14. The central portion 70 of the diaphragm 18 covers the work opening 32. In general, the diaphragm 18 is preferably formed from a flexible elastomeric or plastic material. Examples of suitable elastomeric materials include but are not limited to rubber, neoprene, Hycar® (Noveon, Inc., Cleveland, Ohio), chlorobutyl, urethane, silicone, and ethylene propylene. Other suitable plastic materials include polytetrafluoroethylene (PTFE), and others known to those skilled in the art.

The flexible diaphragm 18 may also include a thin alloy layer 46 molded to, bonded with, or otherwise covering the central portion 70 of the flexible diaphragm 18. The thin alloy layer 46 has a thickness that is small enough so that the thin alloy layer 46 flexes in conjunction with the central portion 70 of the flexible diaphragm 18.

While thin alloy layer 46 is preferably formed of an iron based alloy, it may also include alternative alloys, such as titanium, that can also function to protect fluid flowing through the valve 10 from contamination, especially from leachables in the flexible diaphragm 18. The thin alloy layer 46 is most preferably a stainless steel alloy. The thin alloy layer 46 may be an austenitic alloy including chrome and nickel, which provides an increased corrosion and wear resistance, or a ferritic alloy (chrome, non-nickel), which provides for greater inherent strength and corrosion resistance. "Super stainless steel" alloys with significant additions of chromium, nickel, molybdenum or copper are used where there are requirements for extra corrosion protection, strength, or heat resistance. Low carbon, high purity, high nitrogen, iron base, nickel ("super austenitic") and chrome ("superferritic) bearing alloys may also be used in other applications, and such alloy selections may be developed by those skilled in the art.

A connector element 33 of the central portion is coupled to the actuator mechanism 20. While the connector element 33 in the present embodiment is a T-shaped element, the term connector element 33 should be construed to include any element, feature, or location that is adapted to engage the actuator mechanism 20. In the embodiment of FIG. 1, the central portion of the diaphragm 18 is dome shaped, and the actuator mechanism 20 includes a compressor 34. The compressor 34 is connected to one end of a threaded stem 36, and a handle 38 is connected to an opposite end of the stem 36. In general, turning the handle 38 turns the threaded stem 36, and causes the compressor 34 to move up and down within the bonnet 12, thereby changing a distance between the bottom surface of the diaphragm 18 and the top surface of the weir 28.

In general, the bonnet 12 is adapted to house the actuator mechanism 20, although this should be construed broadly to include instances wherein the actuator mechanism 20 is only partially within the bonnet 12, or merely mounted adjacent to the bonnet 12. In the embodiment of FIG. 1, the bonnet 12 has a flange 40 adapted to receive one side of the peripheral portion of the diaphragm 18. The body 14 has a flange 42 about the work opening 32 adapted to receive an opposite side of the peripheral portion of the diaphragm 18. The flanges 40 and 42 are adapted to receive the band clamp 16, which is preferably annular. The band clamp 16 is adapted to be positioned about the flanges 40 and 42, and to urge the bonnet 12 and the body 14 toward one another when tightened.

The annular shape of the band clamp 16, and the flanges 40 and 42, provide a uniform compression against the diaphragm 18, thereby providing an optimum seal. This is an improvement over the prior art, which has generally relied on square flanges 40 and 42, with fastening mechanisms at the corners, which provide an uneven compressive force.

When tightened about the flange 40 of the bonnet 12 and the flange 42 of the body 14, the band clamp 16 attaches the bonnet 12 to the body 14. Further, the band clamp 16 advantageously generates an evenly distributed force about the outer edges of the flanges 40 and 42 that draws the bonnet 12 and the body 14 toward one another. This action of the band clamp 16 significantly contributes to circumferential sealing between the bonnet 12 and the body 14.

Figure 2:
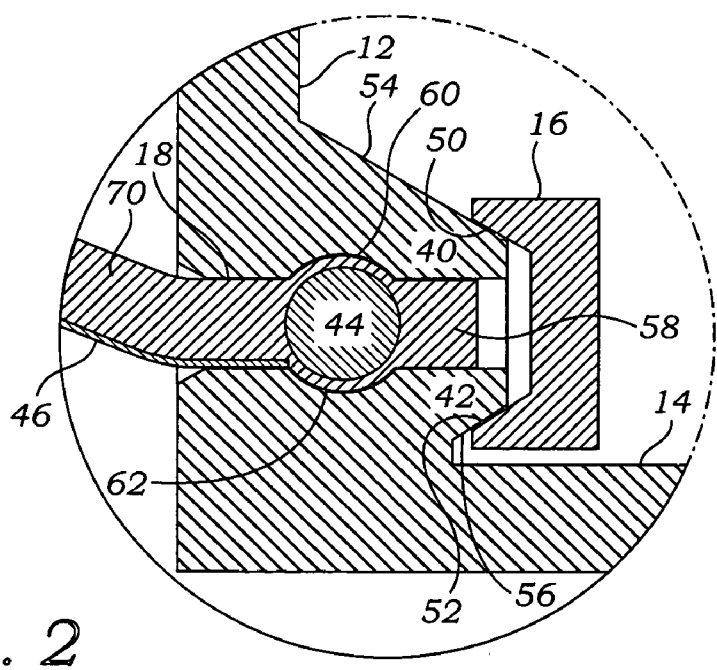
FIG. 2 is a view of a portion of the valve of FIG. 1 illustrating how a peripheral portion of the diaphragm is clamped between the bonnet and the body.
Figure 3:
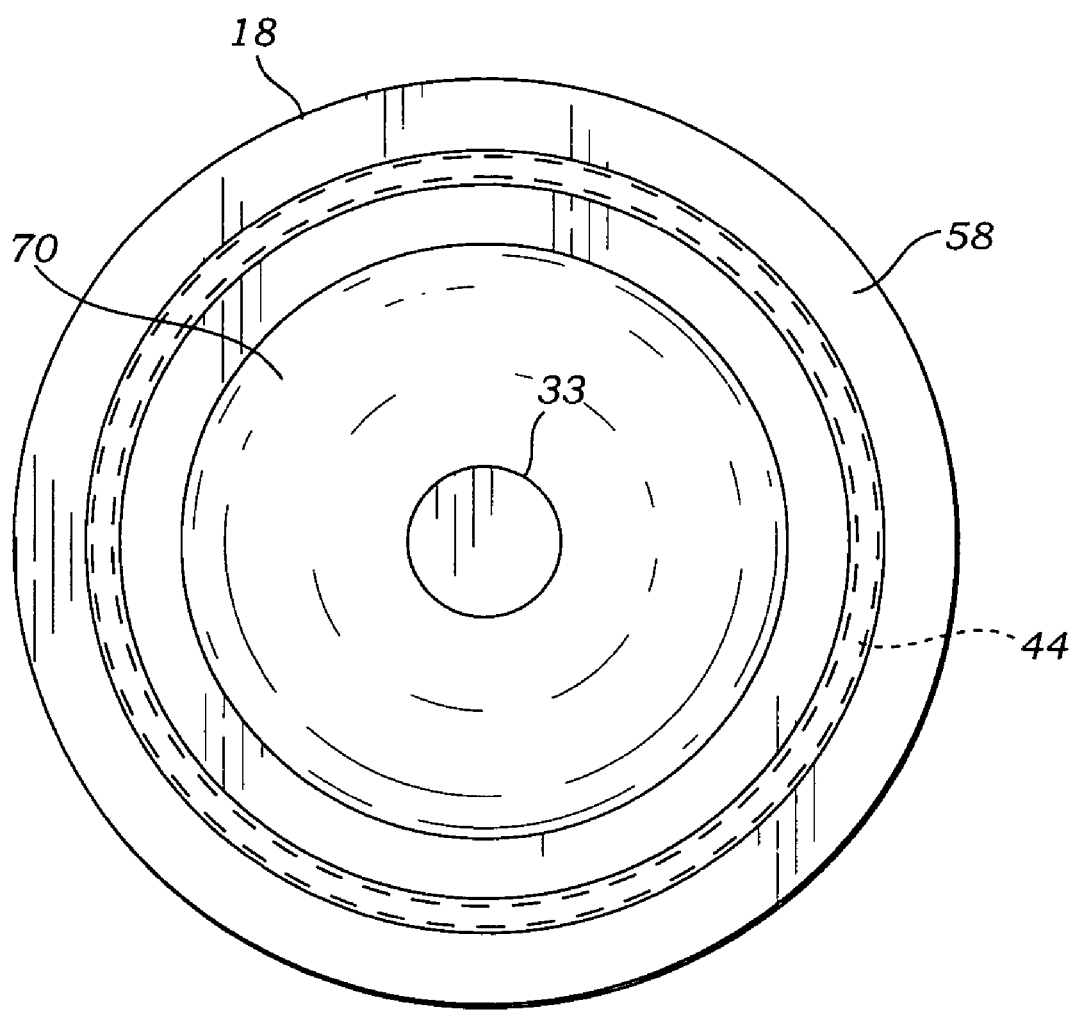
FIG. 3 is a top plan view of the diaphragm of FIGS. 1 and 2.

In the embodiment of FIGS. 1-3, the peripheral portion of the diaphragm 18 has a substantially rigid ring 44 embedded therein. In general, the ring 44 prevents over-compression of the flexible diaphragm 18. As described in detail below, the ring 44 arrests movement of the bonnet 12 and the body 14 toward one another when a magnitude of a force urging the bonnet 12 and the body 14 toward one another exceeds a threshold value. The ring 44 also functions to keep the diaphragm 18 in its proper position with respect to the body 14, without the through-bolts used in the prior art. While the ring 44 is preferably round, it could also be square or some other shape.

FIG. 2 is a view of a portion of the valve 10 of FIG. 1 illustrating how the peripheral portion of the diaphragm 18 is clamped between the bonnet 12 and the body 14. As shown in FIG. 2, the band clamp 16 has a pair of interior contact surfaces 50 and 52. In general, the flange 40 of the bonnet 12 has an outer edge adapted to contact the interior contact surface 50, and the flange 42 of the body 14 has an outer edge adapted to contact the interior contact surface 52. In the embodiment of FIGS. 1 and 2, the interior contact surfaces 50 and 52 of the band clamp 16 are angled with respect to one another so as to substantially form a "V" shape. The flange 40 of the bonnet 12 has an outer side edge 54 with an angle that is substantially equal to an angle of the corresponding interior contact surface 50 of the band clamp 16, and the flange 42 of the body 14 has an outer side edge 56 with an angle that is substantially equal to an angle of the corresponding interior contact surface 52 of the band clamp 16.

In the embodiment of FIGS. 1-3, the ring 44 is totally encapsulated in the material of the diaphragm 18. This may be advantageous where a fluid passing through, and having a flow rate controlled by, the valve 10 may react with, or be contaminated by, the material of the ring 44.

The substantially rigid ring 44 is preferably made of a non-corrosive metal such as stainless steel. Alternately, the ring 44 may be made of any substantially rigid material, such as acetal or polyetherimide (PEI), although those skilled in the art will recognize that a large range of materials are acceptable, and should be considered within the scope of the invention as claimed.

In FIG. 2, the peripheral portion of the diaphragm 18 is labeled "58." The peripheral portion 58 of the diaphragm 18 is clamped between the flange 40 of the bonnet 12 and flange 42 of the body 14. The flange 40 of the bonnet 12 has a groove 60 adapted to receive one side of the ring 44, and the flange 42 of the body 14 has a groove 62 adapted to receive an opposite side of the ring 44.

In FIG. 2 the groove 60 in the flange 40 of the bonnet 12 and the groove 62 in the flange 42 of the body 14 are adapted to receive the ring 44. When the bonnet 12 and the body 14 are subjected to a force that urges the bonnet 12 and the body 14 toward one another (e.g., by the band clamp 16), and a magnitude of the force exceeds a threshold value, movement of the bonnet 12 and the body 14 toward one another is substantially arrested by the ring 44, thereby preventing further deformation of the peripheral portion 58 of the diaphragm 18.

The material of the diaphragm 18 covering the ring 44 so as to encapsulate the ring 44 is preferably thin enough that the ability of the ring 44 to limit movement of the bonnet 12 and the body 14 toward one another is not significantly hampered. Further, the groove 60 in the flange 40 of the bonnet 12, and the groove 62 in the flange 42 of the body 14, are preferably machined with sufficient precision, and made very smooth, such that the material of the diaphragm covering the ring 44 is not ruptured before the ring 44 limits movement of the bonnet 12 and the body 14 toward one another.

FIG. 3 is a top plan view of the diaphragm 18 of FIGS. 1 and 2. In FIG. 3 the diaphragm 18 includes a central portion 70 and a peripheral portion 58 surrounding the central portion 70. The peripheral portion 58 includes the substantially rigid ring 44 extending continuously through or on the peripheral portion 58. While the ring 44 is preferably embedded within the peripheral portion 58, in alternative embodiments it could also be mounted on the peripheral portion 58.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A valve, comprising:
   a body having an input port, a central portion, and an output port;
   a bonnet;
   a flexible diaphragm having a central portion and a peripheral portion surrounding the central portion, wherein the peripheral portion is adapted to be positioned between the bonnet and the body;
   wherein the flexible diaphragm is formed from a flexible elastomeric or plastic material;
   a separate substantially rigid ring of more rigidity than the flexible diaphragm extending continuously through or on the peripheral portion;
   a thin alloy layer molded to, bonded with, or otherwise covering the central portion of the flexible diaphragm;
   an actuator mechanism operatively coupled to the diaphragm for moving the diaphragm between an open configuration wherein the input port and output port are in fluid communication with each other, and a closed configuration wherein the diaphragm blocks the central portion and prevents fluid flow between the input port and the output port; and
   wherein the bonnet is adapted to house the actuator mechanism.

2. The valve of claim 1, wherein the thin alloy layer has a thickness that is small enough such that the thin alloy layer flexes in conjunction with the flexible diaphragm.

3. The valve of claim 2, wherein the thin alloy layer is an iron based alloy.

4. The valve of claim 2, wherein the thin alloy layer is a ferritic iron based alloy.

5. The valve of claim 2, wherein the thin alloy layer is an austenitic iron based alloy.

6. The valve of claim 1, wherein the tin alloy layer includes titanium.

7. A flexible diaphragm valve, comprising:
   a flexible diaphragm comprising:
   a flexible central portion and a peripheral portion surrounding the central portion, the flexible central portion and the peripheral portion being formed from a flexible elastomeric or plastic material;
   a separate substantially rigid ring of more rigidity than the flexible diaphragm extending continuously through or on the peripheral portion;
   a thin alloy layer molded to, bonded with, or otherwise covering the central portion;
   wherein the flexible diaphragm is adapted to be positioned between the bonnet and the body such that the peripheral portion is clamped between the bonnet and the body.

8. The flexible diaphragm of claim 7, wherein the thin alloy layer has a thickness that is small enough such that the thin alloy layer flexes in conjunction with the flexible diaphragm.

9. The flexible diaphragm of claim 7, wherein the flexible central portion further comprises a connector element adapted to engage an actuator mechanism.

10. The flexible diaphragm of claim 9, wherein the flexible central portion is adapted to move between an open configuration and a closed configuration.

11. The flexible diaphragm of claim 7, wherein the thin alloy layer is an iron based alloy.

12. The flexible diaphragm of claim 7, wherein the thin alloy layer is an austenitic iron based alloy.

13. The valve of claim 1, wherein the flexible elastomeric or plastic material includes rubber, neoprene, chlorobutyl, urethane, silicone, ethylene propylene, and/or polytetrafluoroethylene.

14. The flexible diaphragm of claim 7, wherein the flexible elastomeric or plastic material includes rubber, neoprene, chlorobutyl, urethane, silicone, ethylene propylene, and/or polytetrafluoroethylene.

* * * * *